United States Patent Office 2,888,219
Patented May 26, 1959

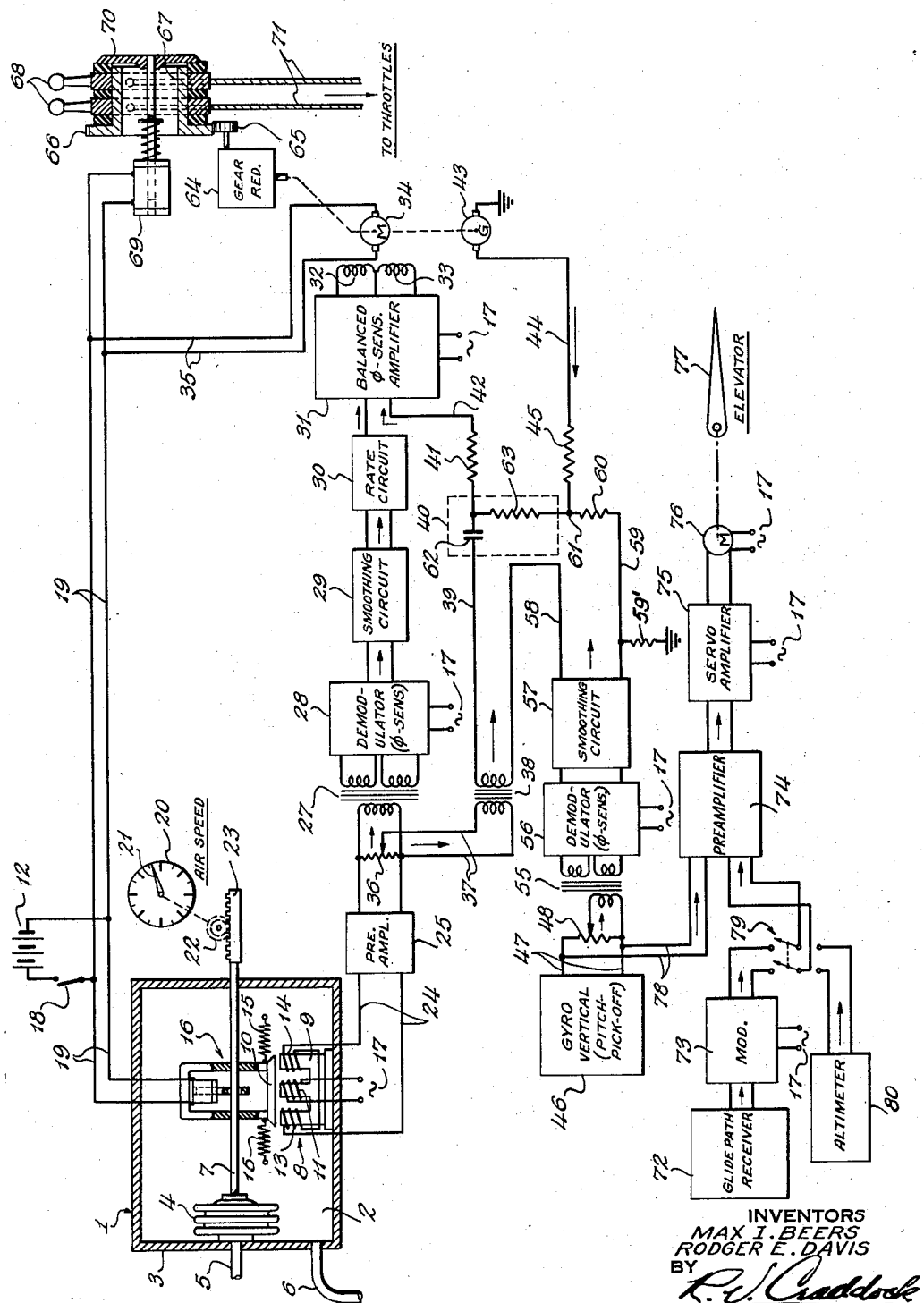

2,888,219

AUTOMATIC CONTROL SYSTEM FOR AIRCRAFT

Max I. Beers, Great Neck, and Rodger E. Davis, Wantagh, N.Y., assignors to Sperry Rand Corporation, a corporation of Delaware Application February 28, 1952, Serial No. 274,015

17 Claims. (Cl. 244—77)

This invention relates to automatic control systems for aircraft wherein the craft is controlled to follow a prescribed flight path at a selected air speed, for example, in accordance with both an altitude reference and also an air speed reference. More specifically, the present invention relates to a system for automatically controlling an aircraft so that it will follow a prescribed flight path, for example, so that it will seek and maintain a prescribed altitude which may either be a constant preselected altitude or a varying altitude such as that defined by a glide slope beam while also automatically controlling the air speed of the aircraft and maintaining it substantially at some preselected value.

Such a flight path may be determined, for example, by an altimeter, a glide slope beam and receiver, or, by a radio link supplying reference data to the craft from a monitoring or guiding source. Hence, when we refer herein to a flight path, it will be understood that it may be provided in any of the foregoing manners.

It will be understood that ordinarily any aircraft is controlled by means of its elevator or equivalent control surface to seek and maintain a prescribed flight path such as a desired altitude. For example, a human pilot or an automatic pilot controls the elevator of an aircraft to change altitude or to maintain a desired altitude. However, such changes in altitude or trimming of the craft to maintain a constant altitude can result in changes in air speed. Assuming that a plane is controlled to follow a glide slope beam, the elevator is employed to correct for deviations of the craft above or below the glide slope. Obviously, if the elevator produces a relative nose-down attitude of the craft, the craft's air speed will increase while if it effects a relative nose-up attitude, the air speed will decrease. The same is true when the craft's attitude is changed in order to maintain a constant altitude.

It is the purpose of the present invention to provide, first, an improved air speed control system and, secondly, an integrated system in which both the elevation and air speed of the craft are controlled to maintain preselected values. In connection with the present invention, it should be observed that the servo loop which includes the altitude reference and a pitch reference controlling the elevators of the craft is one characterized by its relatively short time constant, while the servo loop which also utilizes a signal from the pitch reference, above referred to, and an air speed reference in controlling the throttles or other means controlling the engine thrust and, through the engine thrust, the air speed of the craft, is one having a relatively long time constant. Therefore, in accordance with the present invention, a signal employed in controlling the first mentioned servo loop which has the shorter time constant and is employed to control the elevator and thereby correct for deviations of the aircraft with respect to the selected altitude is supplied preferably when changing in magnitude only, to control the second mentioned servo loop which has the longer time constant and maintains a preselected air speed, since variations in air speed follow or lag corrections in pitch attitude of the craft effecting altitude corrections. More specifically, by additionally employing a component of the pitch signal under changing pitch attitudes of the craft in the control of the air speed of the craft, it serves to anticipate speed changes and hence produces a smoother air speed control.

In the preferred form of this invention, an altitude error signal derived either from an altimeter or a radio receiver, such as a glide slope receiver, together with a pitch signal derived from a vertical reference device, are applied directly to control the elevators of the aircraft. However, instead of supplying a component of the pitch signal directly to the air speed control system, we prefer to employ it only during changing pitch attitudes of the craft. In this way, a persistent pitch signal will not affect the air speed control system and thereby produce, in effect, a false air speed error signal. Only a pitch signal under transient conditions is utilized as an anticipating term in the air speed servo loop.

It is therefore a principal object of the present invention to provide an improved air speed control for aircraft, or, more particularly, an improved throttle control for the engines of an aircraft.

It is also an object of this invention to provide an integrated system for controlling both the altitude and air speed of an aircraft, or, more particularly, the air speed and glide path flight of an aircraft on its approach to an airport runway.

It is another object to provide a system of altitude and air speed control on which a pitch signal is employed in controlling the elevators of the craft and a transient version of this signal is employed in controlling the air speed.

With these and other objects in view, our invention includes the novel elements and the combinations and arrangements of parts forming the systems described below and illustrated in the accompanying drawing, in which the single figure is a schematic representation of preferred embodiments of our systems.

Before entering into a detailed description of the present invention, it should be pointed out that the air speed control system forming a component of our integrated altitude and air speed control system comprises the essential elements of the air speed control system of application Serial No. 724,020, filed in the U.S. Patent Office on January 24, 1947 in the name of Richard N. Bromley now U.S. Patent No. 2,626,767 and assigned to the assignee of the present invention. In connection with air speed control systems where, for example, the throttle valves controlling the output of the aircraft engines are controlled to maintain a preselected air speed, it should be pointed out that the setting of the throttle valves does not necessarily bear any fixed relation to the actual air speed of the craft. Air speed is affected not only by throttle setting, but also by such factors as the pitch attitude of the craft, the position of landing gear, position of flaps, the loading of the aircraft, the pitch of the propeller blades and any other variable which may affect lift or drag in flight. Obviously, all these variables must be considered in determining the correct throttle setting for any given air speed. A human pilot, of course, can adjust the throttles as he sees fit. However, in an automatic air speed control system, it is essential as a practical manner to employ a position repeat back signal of some character which represents the position of the throttle and is compared with the error signals derived from the air speed reference device. In view of the many factors, some of which have been enumerated in the above which affect the throttle setting, a conventional displacement repeat back signal cannot be used. In accordance with the Bromley application Serial No. 724,020, above referred to, such a positional repeat back signal is more or less synthesized by employing a rate generator driven by a throttle servomotor, the output signal of the rate generator being supplied to an integrating network having the character that the integration voltage developed therein will decay with time. As a result, the repeat back signal is momentarily proportional to the output displacement of the throttle servomotor since the integrating device integrates the signal proportion to the velocity output of the throttle servomotor. However, this signal does not persist but decays with time such that if the servomotor operates through the proper displacement to correct for a given air speed error, the throttle control system becomes quiescent with both the repeat back signal and the air speed error signal going to zero. However, should the correction be insufficient, the air speed error signal will cause continued operation of the throttle servomotor until the air speed error has been wiped out. In this manner, the air speed control system is rendered stable due to the use of a repeat back signal and with all of the variables effecting the proper throttle setting being accounted for.

Referring now to the drawing, 1 indicates generally an air speed meter somewhat schematically illustrated as comprising a closed chamber 2 defined by the side walls 3. Within the chamber and suitably secured to one wall thereof, is a Sylphon-bellows 4. Total air pressure is supplied to the interior of the bellows by means of the tube 5. A second tube 6 supplies static pressure to the interior of chamber 2. Expansion and contraction of the bellows 4 is, therefore, dependent upon the difference between the total pressure and the static air pressure, and provides a measure of air speed. Shaft 7 is secured to the bellows 4 and may be supported by means not shown to move in translation, the position thereof being a measure of the air speed of the craft on which the meter is located.

Also positioned within the chamber 2 is a signal pick-off 8 herein illustrated as electrical in character and comprising an E-shaped core 9 and an armature 10, both of which are formed of magnetic material. The signal pick-off is energized by means of winding 11, which is mounted on the central leg of the core and connected with a suitable source of alternating current 17. The pickup windings 13 and 14 surround the outer legs and are connected together in series opposition to supply a signal voltage output of one phase sense or the other, depending upon the relative magnitude of the voltages generated in the two coils. Variations in these voltages are occasioned by movement of the armature 10 from a central position, wherein equal amounts of flux flow through the coil legs, and toward one or the other of the outer core legs, thereby differentially varying the amount of flux flowing in the outer legs.

The armature 10 is normally constrained to a central position, wherein zero voltage output is derived from the signal pick-off, by means of springs 15. A magnetic clutch 16 is connected to the armature 10 and operatively positioned with respect to shaft 7 so that, when energized, movement of shaft 7 will produce a similar movement of the armature 10. The clutch 16 is illustrated as connected with a suitable source of current such as battery 12 and its energization may be controlled by switch 18. It will be understood that the showing of the Sylphon bellows 4 and its pick-off mechanism in the figures is quite diagrammatic, no attempt having been made to show all details of the clutch 16 or the pick-off 14, such parts being known in the art. The clutch 16 may be of any suitable form of electromagnetic coupling and decoupling arrangement for coupling armature 10 of the inductive pick-off so as to be displaced with longitudinal displacements of the shaft 7 and for uncoupling the same therefrom. A preferred construction for Sylphon bellows, its clutching and declutching and pick-off arrangements is shown in the prior patent to A. W. Meston, No. 2,446,546, dated August 10, 1948 and assigned to the assignee of the present application. Also, reference is directed to U.S. Patent No. 2,724,564 of November 22, 1955, in the names of John C. Newton and Max I. Beers and assigned to the assignee of the present invention, for another preferred construction of an air speed control arrangement.

With the foregoing arrangement of air speed meter and signal pick-off, the pilot may bring the craft to the desired air speed with the magnetic clutch de-energized, thereby permitting the Sylphon-bellows to actuate shaft 7 as a measure of air speed while the armature of the signal pick-off 8 remains in a central position providing zero signal output. When, however, the desired air speed is attained, switch 18 may be thrown to energize lines 19 and magnetic clutch 16 connected thereacross to thereby correlate or fix the zero voltage output position of the signal pick-off with the air speed meter at the selected value of air speed. In other words, at the selected air speed, zero signal voltage will be derived from the signal pick-off as long as the craft's actual air speed corresponds to the selected value. However, variations of the actual air speed above or below the selected value will produce a signal voltage output from the E-transformer or pick-off which has a phase sense dependent upon whether the actual air speed exceeds or is less than the selected air speed, and which will be of a magnitude dependent upon the amount of disagreement between the actual and selected values.

Solely for illustration purposes, I have shown an air speed dial 20 which will provide a visual indication of the actual air speed. The pointer 21 on the dial may be actuated by means of a pinion 22 meshing with rack 23 secured to the shaft 7.

The pickup coils of the signal pick-off are connected by leads 24 to a preamplifier 25, the output of which is supplied through transformer 27 to a phase-sensitive demodulator 28. The demodulator 28 is energized with alternating current preferably from source 17 to render it phase sensitive such that the output thereof is a unidirectional voltage proportional in magnitude to the amplitude of the alternating signal voltage supplied to the demodulator and having a polarity sense depending upon the phase sense of the alternating signal voltage. The unidirectional signal voltage from demodulator 28 is then preferably supplied to a smoothing circuit 29 and then to a rate taking circuit 30. Circuit 30 preferably comprises a conventional impedance-capacitance differentiating network which provides in its output a signal voltage proportional to the rate of change of the signal input thereto. This rate voltage is then supplied to the rate channel of a balanced phase sensitive amplifier 31. A suitable form of balanced phase sensitive amplifier is illustrated in U.S. Patent 2,481,550, issued September 13, 1949 in the name of W. T. White and assigned to the assignee of the present invention. The other channel of amplifier 31 serves to amplify a combination of the air speed error voltage and the output of an integrating network, as hereinafter described. Amplifier 31 has its output connected differentially to control the field windings 32 and 33 of a servomotor 34, the armature of which is energized through leads 35 from the source of unidirectional current 12.

A voltage proportional to the air speed error is derived from a potentiometer 36 connected across the input of transformer 27 and the magnitude of this signal is adjustable thereby. Leads 37 connect potentiometer 36 with transformer 38 and one side of the secondary of this transformer is connected through lead 39 to an integrating network indicated generally at 40. The output of integrating network 40 is connected through an impedance such as a resistor 41 and lead 42 to the other channel of amplifier 31. As described below, a repeat back signal proportional to servomotor velocity and a signal proportional to deviations in pitch of the craft are supplied to integrator 40 and its output is supplied together with the air speed error signal through lead 42 to amplifier 31.

The repeat back signal is derived from a p.m. generator 43 which supplies a voltage output proportional to the velocity of servomotor 34. This velocity voltage is supplied through lead 44 and impedance 45 to the integrating network 40 hereinafter more fully described.

The pitch signal which is proportional to deviations in pitch attitude of the aircraft relative to the pitch reference is supplied from a suitable pick-off, for example of the selsyn type, which is mounted on the pitch axis of a vertical reference device herein illustrated as a gyro vertical 46. Leads 47 connects this signal to potentiometer 48.

The pitch signal appearing across potentiometer 48 is supplied through coupling transformer 55 to a phase sensitive demodulator 56. For phase sensing purposes, demodulator 56 is energized from A.C. source 17 and its output which is a unidirectional voltage proportional in magnitude to the amplitude of the pitch error signal and having a polarity reversing with phase reversals of the alternating pitch signal is supplied to a smoothing circuit 57, one side being shown as grounded through resistor 59'. The resistor serves to hold the circuit combining the various control voltages above ground potential. A suitable type of smoothing circuit which may be employed as the smoothing circuit 57 is disclosed in U.S. Patent 2,515,249, issued July 18, 1950 in the name of R. D. McCoy and assigned to the assignee of the present invention. The output of the smoothing circuit is connected by means of lead 58 to one end of the secondary of transformer 38 and through lead 59 and impedance 60 to terminal 61 to which the speed voltage from generator 43 is also connected.

It will be seen that integrating network 40 which comprises integrating condenser 62 and impedance 63 has three control voltages supplied thereto. These are the speed voltages derived from generator 43, the pitch error signal derived initially from the gyro vertical 46 and the air speed error signal derived initially from the air speed measuring device 1. It will be noted that the speed signal and the pitch signal are both unidirectional voltages while the air speed signal is an alternating voltage. The integrating network serves to integrate the speed voltage to provide a voltage proportional to the output displacement of servomotor 34 which voltage will gradually decay with time. The alternating air speed error signal passes through the integrating condenser 62 without any appreciable attenuation while the pitch signal will be blocked by condenser 62 except when it is of changing magnitude. Therefore, the signal voltages supplied by lead 42 to amplifier 31 will be respectively proportional to the magnitude of the air speed error, any pitch error during changing pitch attitudes only and the output displacement of servomotor 34 which does not persist when the displacement is a constant but decays with time.

As hereinabove indicated, the output of amplifier 31 serves differentially to control the field windings of motor 34 and thereby effects an operation of the motor in one direction or the other depending upon the phase or polarity sense of the resultant signal supplied to the input of said amplifier. In the drawing, the output of servomotor 34 is diagrammatically illustrated as driving through a gear reduction mechanism 64, the output of which is represented by gear 65 meshing with gear 66 which is secured to or integral with drum 67. A pair of manual throttle controls 68 is shown and drum 67 is coupled thereto by means of a magnetic clutch illustrated as comprising a solenoid coil 69 which is energized through leads 19 from source 12 when switch 18 is closed. The movable core of the solenoid terminates in a plate 70 which upon energization of coil 69 engages the end of drum 67 and also frictionally engages the throttle controls through the medium of the compressible washers interposed therebetween. When de-energized a spring and collar on the core of the solenoid effects disengagement of the drum and throttle controls. For illustration purposes, the controls 6 and 8 are shown as operating cables 71 which are adapted to be connected with the engine throttles.

That part of our integrated control system which primarily controls the altitude of a craft in accordance with some reference such as an altimeter or a beam-defined radio glide path will now be described. The servo loop by means of which a desired reference altitude is maintained comprises a radio receiver 72 which is responsive to the glide slope beam. The unidirectional voltage output of this receiver is fed to a modulator 73 preferably energized from alternating current source 17. The output of modulator 17 is fed to a preamplifier 74 and thence to a servo amplifier 75. A suitable form of preamplifier is illustrated in the above-noted U.S. Patent 2,515,249. The amplifier 75 is energized from the source of reference voltage 17 and the output is fed, for example, to a two-phase motor 76 which, as schematically illustrated, is connected to drive the elevators 77 of the aircraft. The polarity sense of the signal derived from the glide path receiver 72 is dependent upon the displacement of the craft above or below the glide path and the output of modulator 73 will have a phase sense depending upon the polarity of the receiver output. Hence, since the output of amplifier 75 is fed to the control phase of servomotor 76 and its energization is arranged to have a 90° time phase relation with respect to that of source 17, servomotor 76 will rotate in one direction or the other in accordance with the polarity of the output of glide path receiver 72. It will be observed that a signal from the gyro vertical 46 is also fed to amplifier 74 by leads 78. Therefore, servomotor 76 will be controlled in accordance with both of these signals, that is, the glide slope signal and the pitch signal from the gyro vertical. For maintaining constant altitude, a switch 79 may be operated alternatively to connect an altimeter 80 to the input of amplifier 74 and, in this case, the elevators will be controlled in accordance with the error signal derived from the altimeter and a pitch signal derived from the gyro vertical, the pick-off from the altimeter preferably being of a type supplying an alternating signal voltage.

The operation of our integrated system wherein a prescribed altitude and a prescribed air speed are maintained and the operation of our improved system for controlling air speed are as follows. As hereinabove pointed out, the servo loop, involving the elevators by which a reference altitude is maintained, has a relatively short time constant. Variations in aircraft speed may result from changes in pitch attitude of the craft due to operations of the elevators. However, the resulting effect on the craft air speed lags the operations of the elevator servo loop and hence the air speed servo loop has a relatively longer time constant when considering the common source of influence, that is, the altitude reference device.

First assuming that the craft is displaced above or below the glide path, the output of glide path receiver 72 will control the elevators to cause the craft to seek the glide path. If the craft is below the glide path, the elevators will be operated to cause the craft to climb toward the glide path. This will produce a relative nose-up attitude of the craft thereby, after a delay, causing the air speed of the craft to decrease. Under the reverse conditions, that is with the craft above the glide path, the elevators will be operated to produce a relative nose-down attitude of the craft, thereby producing an increased air speed. The pitch signal derived from the gyro vertical however is fed to amplifier 74 of the elevator servo loop to oppose the signal from the glide path receiver. This, in effect, constitutes a positional repeat back such that the change in pitch attitude of the craft is proportional to the glide slope error. As a result, the elevator control system is adequately damped to prevent oscillations of the craft about the glide slope, or about a constant altitude reference if the altimeter is employed.

The throttles of the craft, or, in a broad sense, the engine thrust, is primarily controlled by the air speed reference device which may be manually set or set by remote control, if desired, when the craft has attained the desired air speed. Any deviations from this selected speed produces a signal which passes through the integrating network 40 to amplifier 31. A component of this signal is demodulated and differentiated to provide a signal proportional to the rate of change of the air speed error signal. This latter signal improves the response characteristics of the system and also is employed as a damping factor. The repeat back signal derived from speed generator 43, which is integrated by the integrating network 40 to provide a displacement signal proportional to the output displacement of servomotor 34, is also supplied to amplifier 31 in opposition to the air speed error signal. Since the integration signal decays with time and goes to zero when the displacement output of servomotor 34 is a constant, the throttle controls 68 will be positioned so as to reduce the air speed error signal to zero and this result is achieved regardless of the various factors which affect the throttle setting for a desired air speed. In addition to the foregoing air speed error signal and repeat back signal, a component of the pitch signal derived from the gyro vertical 46 is also supplied through the integrating network 40 to amplifier 31. Since this signal is of a unidirectional character, it will be blocked by condenser 62 of the integrating network when the pitch signal is of constant magnitude. However, when the pitch signal changes in magnitude it will pass through the integrating condenser 62 and be supplied to the amplifier 31. This signal is supplied to amplifier 31 such that it will anticipate changes in air speed of the craft due to changes in pitch attitudes of the craft occasioned by an operation of the elevators. In other words, if the attitude of the craft should alter to provide a relative nose-up attitude thereby tending to result in a decrease in air speed, the pitch signal from the gyro is supplied to amplifier 31 in such a polarity sense as to cause motor 34 to advance the throttle controls to a position producing increased engine output such that for this new position of the throttles, substantially no air speed error will result due to the change in attitude of the craft. This operation will take place substantially simultaneously with a change in attitude of the craft and hence will anticipate the speed change which otherwise would be detected by the air speed reference device. If due to this pitch signal, the throttle controls are not set accurately to maintain air speed, the air speed reference device will provide an error signal which in turn will correct any resulting error, though this will ordinarily be relatively small. Since the operation of the air speed servo loop is of a relatively longer time constant and the effect of the elevator servo loop thereon lags the operation of the altitude control servo loop, the effect of the pitch signal from the gyro vertical during transient or changing pitch attitudes of the craft serves to smooth the operation of the air speed servo loop and provides a more precise and desirable operation without hunting and the like in the control of the air speed of the craft and likewise in the control of both the air speed and altitude of the craft.

While we have described our invention in its preferred embodiments it is to be understood that the words which we have used are words of description rather than of limitation and that changes within the purview of the appended claims may be made without departing from the true scope and spirit of our invention in its broader aspects.

What is claimed is:

1. A control system for aircraft speed control comprising an air speed meter, a pick-off for supplying a signal depending on deviation in air speed of the craft from a selected air speed value, a vertical reference device and circuit means coupled therewith for supplying a pitch error signal only during changes in the pitch attitude of the craft relative to said vertical reference, engine thrust control means, a servomotor operatively connected to drive said control means, means for supplying a repeat back signal proportional to the output displacement of said servomotor but gradually decaying with time whereby it may go to zero when the displacement becomes constant, and means for controlling said servomotor in accordance with all of said signals.

2. A control system for aircraft speed control comprising an air speed meter, a pick-off for supplying a signal depending on deviation in air speed of the craft from a selected air speed value, a vertical reference device and means coupled therewith for supplying a pitch error signal proportional to the pitch attitude of the craft relative to said vertical reference, engine thrust control means, a servomotor operatively connected to drive said control means, means for suppressing said pitch signal except during changing pitch attitudes of the craft, whereby no signal is supplied during constant pitch attitudes, and means for controlling said servomotor in accordance with said air speed signal and the signal from said last-mentioned means.

3. A control system for aircraft speed control comprising an air speed meter, a pick-off for supplying a signal depending on deviation in air speed of the craft from a selected air speed value, a vertical reference device and means coupled therewith for supplying a pitch error signal proportional to the pitch attitude of the craft relative to said vertical reference, engine thrust control means, a servomotor operatively connected to drive said control means, means for suppressing said pitch signal except during changing pitch attitudes of the craft, whereby no signal is supplied during constant pitch attitudes, means for supplying a repeat back signal proportional to the output displacement of said servomotor but gradually decaying with time whereby it may go to zero after the displacement becomes a constant, and means for controlling said servomotor in accordance with said air speed deviation signal and the signals supplied by said last two above-mentioned means.

4. A control system for aircraft speed control comprising an air speed meter, a pick-off for supplying a signal depending on deviation in air speed of the craft from a selected air speed value, a vertical reference device and means coupled therewith for supplying a temporary pitch error signal proportional to changes in the pitch attitude of the craft relative to said vertical reference, engine thrust control means, a servomotor operatively connected to drive said control means, means for supplying a repeat back signal proportional to the output displacement of said servomotor but gradually decaying with time whereby it may go to zero when the displacement becomes a constant, servomotor control means to which said air speed error signal and said repeat back signal are supplied, and means for supplying said pitch signal to said servomotor control means only when said pitch signal varies in amplitude, said last mentioned means serving to block said pitch signal while the pitch attitude of said craft remains a constant.

5. A control system for aircraft speed control comprising air speed measuring means, an electrical pick-off associated therewith for supplying a signal voltage depending upon deviation in air speed of the craft from a selected air speed value, a servomotor for controlling engine thrust, a vertical reference device, an electrical pick-off coupled therewith, and circuit means coupled with said pick-off for supplying a signal only during changes in the pitch attitude of the craft relative to the vertical reference, means for supplying a signal voltage proportional to the output displacement of said servomotor but gradually decaying with time whereby it may go to zero when the displacement becomes a constant, amplifier means to which all of said signal voltages are supplied, and connecting means between said amplifier and servomotor for controlling said servomotor in accordance with all of said signal voltages.

6. A control system for aircraft speed control comprising air speed measuring means, an electrical pick-off coupled therewith for supplying a signal voltage depending upon deviation in air speed of the craft from a selected air speed value, a servomotor for controlling engine thrust, a vertical reference device and an electrical pick-off coupled therewith for supplying a signal voltage proportional to deviations in pitch attitude of the craft relative to the vertical reference, means for supplying a signal voltage proportional to servomotor speed, electrical integrating means connected to receive said speed voltage and to supply a voltage approximately proportional to a time integration thereof, said integrating means being operable to provide a gradual decaying integration voltage whereby it may go to zero when the motor speed goes to zero, said pitch signal being connected to said integrating means so that a signal voltage proportional only to changing pitch signals is supplied at the output of said integrating means while no signal proportional to pitch during constant pitch attitudes will appear at said output, and means for controlling said servomotor in accordance with said air speed error signal and the output of said integrating means.

7. A control system for aircraft speed control of the character recited in claim 6 in which the electrical integrating means comprises an impedance-capacitance integrating network.

8. A system for automatically controlling an aircraft including a first servo loop comprising a reference device defining a flight path, and means coupled therewith for providing a flight path error signal proportional to displacement of said craft from the prescribed flight path, a vertical reference device and means coupled therewith for supplying a pitch error signal proportional to the pitch attitude of the craft relative to the vertical reference, an elevator and a first servomotor means controlled by said flight path error signal and said pitch error signal for controlling said elevator, and a second servo loop comprising an air speed meter and means coupled therewith for providing a signal proportional to deviations in air speed of the craft from a selected air speed value, engine thrust control means, a second servomotor operatively connected to drive said thrust control means, and means for controlling said second servomotor in accordance with said air speed error signal and a transient function only of said pitch error signal, said second loop normally having a longer time constant than said first loop.

9. A system for automatically controlling an aircraft including a first servo loop comprising a reference device defining a flight path and means coupled therewith for providing a flight path error signal proportional to displacement of said craft from the prescribed flight path, a vertical reference device and means coupled therewith for supplying a pitch error signal proportional to the rate of change of pitch attitude of the craft relative to the vertical reference, an elevator and a first servomotor means controlled by said flight path error signal and said pitch error signal for controlling said elevator, a second servo loop comprising an air speed meter and means coupled therewith for providing a signal proportional to deviations in air speed of the craft from a selected air speed value, engine thrust control means, a second servomotor operatively connected to drive said thrust control means, means for supplying a repeat back signal proportional to the output displacement of said second servomotor but gradually decaying with time whereby it may go to zero when the displacement becomes a constant, and means for controlling said second servomotor in accordance with said air speed error signal and said pitch error signal and said repeat back signal.

10. A system for automatically controlling an aircraft including a first servo loop comprising a reference device defining a flight path and means coupled therewith for providing a flight path error signal proportional to displacement of said craft from the prescribed flight path, a vertical reference device, means coupled therewith for supplying a pitch signal, an elevator and a first servomotor controlled by said flight path error signal and said pitch error signal for controlling said elevator, a second servo loop comprising an air speed meter and means coupled therewith for providing a signal proportional to deviations in air speed of the craft from a selected air speed value, engine thrust control means, a second servomotor operatively connected to drive said thrust control means, means for controlling said second servomotor in accordance with said air speed error signal and also in accordance with said pitch error signal only during changing pitch attitudes of the craft.

11. A system for automatically controlling an aircraft including a first servo loop comprising a reference device defining a flight path and means coupled therewith for providing a flight path error signal proportional to displacement of said craft from the prescribed flight path, a vertical reference device, means coupled therewith for supplying a pitch signal, an elevator and a first servomotor controlled by said flight path error signal and said pitch error signal for controlling said elevator, a second servo loop comprising an air speed meter and means coupled therewith for providing a signal proportional to deviations in air speed of the craft from a selected air speed value, engine thrust control means, a second servomotor operatively connected to drive said thrust control means, means for supplying a temporarily existing repeat back signal proportional to the output displacement of said second servomotor, means controlled by said pitch signal for supplying a transient signal only during changing pitch attitudes of the craft, and means for controlling said second servomotor in accordance with said air speed error signal, said repeat back signal and said transient signal.

12. A system for automatically controlling an aircraft including a first servo loop comprising a reference device defining a flight path and a pick-off coupled therewith for providing a flight path error signal voltage proportional to displacement of the craft from the prescribed flight path, a vertical reference device and a pick-off coupled therewith for supplying a pitch error signal voltage proportional to the pitch attitude of the craft relative to the vertical reference, an elevator and a first servomotor controlled by said flight path error signal and said pitch error signal for controlling said elevator, and a second servo loop comprising an air speed meter and a pick-off coupled therewith for supplying an air speed error signal voltage proportional to deviations in air speed of the craft from a selected air speed value, engine thrust control means, a second servomotor operatively connected to drive said thrust control means, means for supplying a repeat back signal voltage proportional to the speed of said servomotor, electrical integrating means connected to receive said speed voltage and to supply a voltage output approximately proportional to a time integration thereof but decaying with time whereby it may go to zero when the servomotor displacement becomes a constant, means for supplying a component of said pitch error signal to said integrating means whereby the output of the latter includes a signal variable in accordance with a time function of said pitch error signal, and means for controlling said second servomotor in accordance with said air speed error signal and the output of said integrating means.

13. A system of the character recited in claim 12 in which the integrating means comprises an impedance-capacitance network.

14. A system of the character recited in claim 8 in which the flight path-defining reference device comprises a radio glide slope beam receiver.

15. A system of the character recited in claim 8 in which the flight path-defining reference device comprises an altimeter.

16. A system for automatically controlling an aircraft including a first servo loop comprising a reference device defining a flight path and means coupled therewith for providing a flight path error signal proportional to displacement of said craft from the prescribed flight path, a vertical reference device and means coupled therewith for supplying a pitch error signal proportional to the pitch attitude of the craft relative to the vertical reference, an elevator and a first servomotor means controlled by said flight path error signal and said pitch error signal for controlling said elevator, and a second servo loop comprising an air speed meter and means coupled therewith for providing a signal proportional to deviations in air speed of the craft from a selected air speed value, engine thrust control means, a second servomotor operatively connected to drive said thrust control means, means for supplying a transient signal dependent upon but only during changing magnitudes of said elevator-controlling error signs, and means for controlling said second servomotor in accordance with said air speed signal and said transient signal.

17. A system for automatically controlling an aircraft including a first servo loop comprising a flight path reference device for providing a flight path error signal proportional to the displacement of said craft from the prescribed flight path, a vertical reference device for supplying a pitch error signal proportional to deviations in the pitch attitude of the craft determined by said reference device, an elevator and a first servomotor means controlled by said flight path error signal and said pitch error signal for controlling said elevator, a second servo loop comprising an air speed meter for providing a signal proportional to deviations in the air speed of the craft from a selected air speed value, engine thrust control means, a second servomotor operatively connected to drive said thrust control means, means connected with said second servomotor for supplying a feedback signal proportional to its speed, a serially connected impedance-capacitance network, means for so supplying said pitch error signal to said network such that an output thereof is produced only during changing magnitudes of said pitch error signal, means for so supplying said feedback signal to said network such that said feedback signal decays with time whereby it may go to zero when the servomotor displacement becomes constant, and means for supplying said air speed deviation signal and the output of said network to said second servomotor.

References Cited in the file of this patent

UNITED STATES PATENTS

| | | |
|---|---|---|
| 1,966,170 | Greene | July 10, 1934 |
| 2,110,622 | Fischel | Mar. 8, 1938 |
| 2,162,862 | Protzen | June 20, 1939 |
| 2,167,077 | Koester | July 25, 1939 |
| 2,191,250 | Fischel | Feb. 20, 1940 |
| 2,387,795 | Isserstedt | Oct. 30, 1945 |
| 2,391,896 | Hanson | Jan. 1, 1946 |
| 2,415,092 | Frische et al. | Feb. 4, 1947 |
| 2,415,819 | Halpert et al. | Feb. 18, 1947 |
| 2,423,336 | Moseley | July 1, 1947 |
| 2,429,642 | Newton | Oct. 28, 1947 |
| 2,496,294 | Kellogg | Feb. 7, 1950 |
| 2,507,304 | Hofstadter | May 9, 1950 |
| 2,553,983 | Saxman | May 22, 1951 |
| 2,582,305 | Young | Jan. 15, 1952 |
| 2,592,173 | Noxon et al. | Apr. 8, 1952 |
| 2,611,559 | Meredith | Sept. 23, 1952 |
| 2,613,352 | Kellogg | Oct. 7, 1952 |
| 2,664,254 | Hendrickson | Dec. 29, 1953 |
| 2,677,513 | Kliever | May 4, 1954 |

FOREIGN PATENTS

| | | |
|---|---|---|
| 683,354 | Great Britain | Nov. 26, 1952 |